No. 743,598. PATENTED NOV. 10, 1903.
E. TWEEDY.
ELECTRIC BATTERY.
APPLICATION FILED DEC. 31, 1902.
NO MODEL.
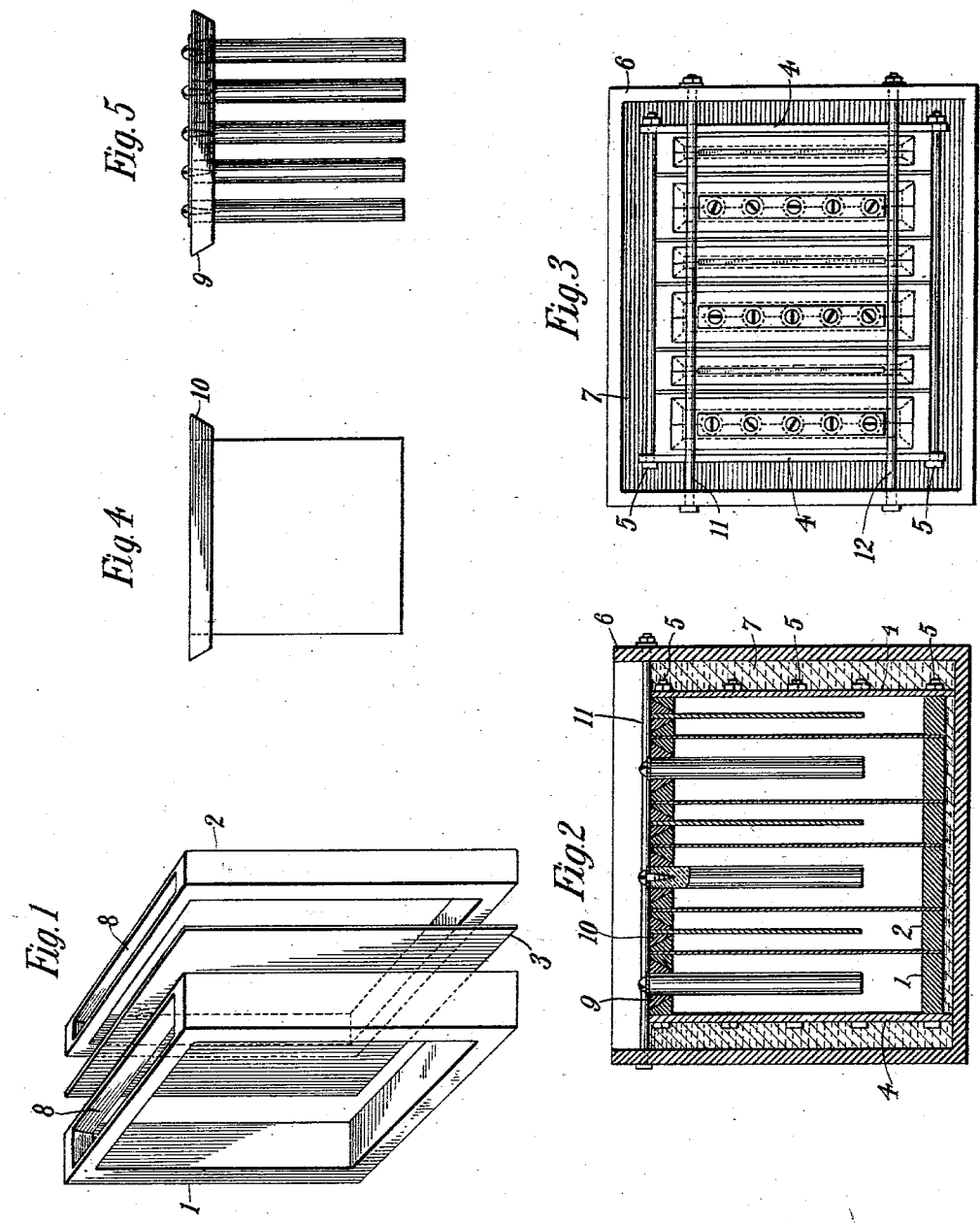
Witnesses:
Edmund Tweedy, Inventor
by Kerr, Page & Cooper, Att'ys No. 743,598. Patented November 10, 1903.

UNITED STATES PATENT OFFICE.

EDMUND TWEEDY, OF NEW YORK, N. Y., ASSIGNOR TO THE ROBERTS BATTERY COMPANY, A CORPORATION OF NEW YORK.

ELECTRIC BATTERY.

SPECIFICATION forming part of Letters Patent No. 743,598, dated November 10, 1903.

Application filed December 31, 1902. Serial No. 137,265. (No model.)

*To all whom it may concern:*

Be it known that I, EDMUND TWEEDY, a citizen of the United States, residing at New York, borough of Manhattan, county and State of New York, have invented certain new and useful Improvements in Electric Batteries, of which the following is a specification, reference being had to the drawings accompanying and forming part of the same.

In using a two-fluid chemical battery as a source of electricity it is essential to its economical employment that the fluid be properly proportioned not only as to quantity, but also to cover the proper amount of surface of the positive and negative elements. The first requirement is easily met and under ordinary circumstances the second also; but in cells wherein the electrolytic diaphragm which separates the fluids is flexible it is difficult to so adjust and arrange the diaphragm that the proper quantity of fluid will also cover the element to the desired height. This is due to the fact that such a diaphragm sags out of position, stretches, and otherwise becomes distorted, so that the cubical contents of the vessel cannot be determined or how far a given quantity of liquid will rise in the same. To overcome this obstacle to the use of such diaphragms and for other purposes, I have devised the present invention, which will be more clearly understood by referring to the drawings, in which—

Figure 1 shows in perspective two sections and a diaphragm as used in my battery. Figs. 2 and 3 are section and plan views, respectively, of the complete cell and case therefor. Fig. 4 shows the positive element, and Fig. 5 shows the negative.

In Fig. 1, 1 and 2 designate frames of wood, hard rubber, or other suitable material. 3 is a flexible electrolytic diaphragm intended to be tightly stretched and attached to one of the frames, as 2, in any suitable manner, as by means of small tacks. A number of sections are thus covered and then assembled, as shown in Fig. 2, there being a diaphragm between each frame and the next succeeding. End plates or heads 4 of suitable material are then arranged as appears in Figs. 2 and 3 and firmly drawn together by means of screw-rods 5. In order to make the whole liquid-tight and to protect it from injury, the cell is now placed in a box or vessel of suitable size, as 6, after which melted paraffin or its equivalent is poured into the space 7 between the cell and the case. When the wax hardens, both vessels are perfectly impervious. As thus constructed the battery possesses a number of advantages. For example, the compartments can be made in any size, and the diaphragms being perfectly plane the capacity of the cells may be accurately and readily determined. In the cell shown the compartments for the negative elements are made smaller than those for the positive plates. The large number of sections provides for a large number of elements with large exposed surface, which, combined with the close proximity of the elements to reduce internal resistance, gives a current of great quantity. For this purpose the battery may be composed of any number of sections from two to as many as required, or instead of one large cell a number of smaller cells may be combined in one battery by substituting for each alternate electrolytic diaphragm a sheet or diaphragm of impervious material, as hard rubber or glass.

In order to prevent spilling of the liquid contents and slopping of the liquid from one compartment to another when the battery is exposed to jars and shocks or when it is used on a self-propelled vehicle, I provide covers 9 10 for the openings 8 and for convenience attach the electrodes to such covers so that they are suspended in the cells. For the purpose of securing a perfectly tight joint I prefer to make the openings and covers or cover-plates correspondingly tapered, as shown. The latter may also be sealed in place with paraffin or other suitable material, but under ordinary circumstances this method is unnecessary. The electrodes or elements may be secured to the cover-plates in any convenient manner, as by making the plates each in sections or parts, as shown in Fig. 3, with the elements firmly clamped between.

The negative element (illustrated in Fig. 5) consists of a series of carbon rods or pencils, which fit in registering grooves in each of the cover-sections. Connections may be made with the electrodes in any convenient way, as by soldering a wire to the zinc plates or affixing a binding-post thereto and by fastening a thin copper strip along the flush tops of the carbon-rods, to which strip a wire or suitable screw connector may be secured.

Various means may be employed to lock the cover-plates in position—as, for example, that shown in Figs. 2 and 3, in which screw clamping-rods 11 12 extend across the box or vessel 6, bearing firmly on the covers just outside the upper ends of the elements. These rods also serve to hold the entire battery firmly in place in the box and may be readily removed when desired.

I am aware that batteries have heretofore been built up of sections with interposed electrolytic diaphragms, but I do not know or believe that such means as I have devised for rendering a built-up sectional battery liquid-tight have ever been used before.

The forms shown and described I regard as typical merely of my invention.

What I claim is—

1. In a built-up sectional cell or battery, the combination with a section having an open top, of a tightly-fitting cover therefor made in sections carrying an element of the cell or battery between its sections, as and for the purposes set forth.

2. In a built-up sectional cell or battery, the combination with a section having an open top and a tightly-fitting cover therefor, of clamping devices for holding said cover securely in place, as and for the purposes set forth.

3. In a built-up sectional cell or battery, the combination with a plurality of sections each having an opening in its top, tightly-fitting covers therefor carrying elements of the cell or battery, and a box or vessel in which the assembled sections are placed, of one or more clamping-rods extending across the box or vessel adjacent to said covers to hold the latter securely in position, as and for the purposes set forth.

EDMUND TWEEDY.

Witnesses:
M. LAWSON DYER,
S. S. DUNHAM.